United States Patent
Keyhl et al.

[11] Patent Number: 6,101,475
[45] Date of Patent: Aug. 8, 2000

[54] METHOD FOR THE CASCADED CODING AND DECODING OF AUDIO DATA

[75] Inventors: Michael Keyhl, Nürnberg; Harald Popp, Tuchenbach; Ernst Eberlein, Grossenseebach; Karl-Heinz Brandenburg, Erlangen; Heinz Gerhauser, Waischenfeld; Christian Schmidmer, Fürth, all of Germany

[73] Assignee: Fraunhofer-Gesellschaft zur Forderung der Angewandten Forschung, Munich, Germany

[21] Appl. No.: 08/696,890

[22] PCT Filed: Oct. 21, 1994

[86] PCT No.: PCT/EP94/03478

§ 371 Date: Aug. 21, 1996

§ 102(e) Date: Aug. 21, 1996

[87] PCT Pub. No.: WO95/22858

PCT Pub. Date: Aug. 24, 1995

[30] Foreign Application Priority Data

Feb. 22, 1994 [DE] Germany ............... 44 05 659

[51] Int. Cl.⁷ .................................. G10L 21/04
[52] U.S. Cl. ............................................. 704/503
[58] Field of Search .................... 704/201, 224, 704/226, 229, 503

[56] References Cited

U.S. PATENT DOCUMENTS

| | | | |
|---|---|---|---|
| 4,361,893 | 11/1982 | Bonnerot | 375/27 |
| 4,868,867 | 9/1989 | Davidson et al. | 381/36 |
| 4,924,480 | 5/1990 | Gay et al. | 375/8 |

(List continued on next page.)

FOREIGN PATENT DOCUMENTS

| | | |
|---|---|---|
| 3-102926 | 4/1991 | Japan . |
| 3-173224 | 7/1991 | Japan . |
| 4-8064 | 1/1992 | Japan . |
| 4-261234 | 9/1992 | Japan . |
| 2249928 | 5/1992 | United Kingdom . |

OTHER PUBLICATIONS

AES Recommended Practice For Digital Audio Engineering—Serial Transmission Format For Two–Channel Linearly Represented Digital Audio Data, J. Audio Eng. Soc., vol. 40, No. 3, Mar. 1992, pp. 148–165.

P. Evans, "Digital Audio In The Broadcase Culture," EBU Review (European Broadcasting Union) Technical, No. 241–242, Jun./Aug. 1980, pp. 118–127.

(List continued on next page.)

*Primary Examiner*—Krista Zele
*Assistant Examiner*—Michael N. Opsasnick
*Attorney, Agent, or Firm*—Wolf, Greenfield & Sacks, P.C.

[57] ABSTRACT

In a method for the cascaded coding and decoding of audio data the spectral components of the short-time spectrum associated with a data block are formed for each data block with a certain number of time input data, the coded signal is formed, by quantization and coding, on the basis of the spectral components for this data block and using a psychoacoustic model to determine the bit distribution for the spectral components, whereupon time output data are obtained by decoding at the end of each codec stage.

To prevent a deterioration in the sound quality in codec cascades with a plurality of stages, an identification code is added to the coded signal at an initial stage to mark the start of the data block; furthermore, the subsequent codec stages divide the data blocks to be coded on the basis of this identification code.

7 Claims, 2 Drawing Sheets

U.S. PATENT DOCUMENTS

| | | | |
|---|---|---|---|
| 5,189,669 | 2/1993 | Masaktsu | 370/84 |
| 5,231,492 | 7/1993 | Dangi et al. | 358/143 |
| 5,260,980 | 11/1993 | Akagiri et al. | 375/122 |
| 5,323,396 | 6/1994 | Lokhoff | 395/2.1 |
| 5,359,626 | 10/1994 | Kloker et al. | 375/7 |
| 5,404,377 | 4/1995 | Moses | 395/2.11 |
| 5,414,795 | 5/1995 | Tsutsui et al. | 395/2.13 |
| 5,467,086 | 11/1995 | Jeong | 341/50 |
| 5,471,558 | 11/1995 | Tsutsui | 395/2.28 |
| 5,488,665 | 1/1996 | Johnston et al. | 381/2 |
| 5,504,832 | 4/1996 | Taguchi | 395/2.1 |
| 5,619,197 | 4/1997 | Nakamura | 341/50 |
| 5,634,082 | 5/1997 | Shimoyoshi et al. | 395/2.38 |
| 5,661,755 | 8/1997 | Van De Kerkhof | 395/2.38 |

OTHER PUBLICATIONS

T. Yagisawa, "Coding And Decoding Apparatus," Canon Co., Ltd., Japanese Patent Application Laying–Open Gazette No. 4–8064, Jan. 13, 1992 (Summary).

K. Sawada, "Variable–Length Coding and Decoding System," NTT Corp., Sony Corp., Japanese Patent Application Laying–Open Gazette No. 3–173224, Jul. 26, 1991 (Summary).

"AES Recommended practice for digital audio engineering—Serial transmission format for two–channel linearly represented digital audio data", J. Audio Eng. Soc., vol. 40, No. 3, 1992 Mar., 148–183.

Davidson, Grant et al, "Low–Complexity Transform Coder for Satellite Link Applications", Audio Engineering Society Preprint # 2966, Sep. 1990, 1–22.

Todd, Craig C., "Flexible Perceptual Coding for Audio Transmission and Storage", Audio Engineering Society Preprint # 3796, Feb. 26–Mar. 1, 1994, 1–16.

METHOD FOR THE CASCADED CODING AND DECODING OF AUDIO DATA

FIELD OF THE INVENTION

The present invention refers to a method for the cascaded coding and decoding of audio data.

In particular, the present invention refers to a method for the cascaded coding and decoding of audio data which is designed to improve the sound quality of a sound signal, generated on the basis of the audio data, following cascaded audio coding/decoding.

BACKGROUND OF THE INVENTION

In the cascaded coding and decoding of audio data, the spectral components of the short-time spectrum associated with a data block are formed within each codec stage of the cascade for each data block with a certain number of input data. A coded signal is then formed, by quantization and coding, on the basis of the spectral components for this data block and using a psycho-acoustic model to determine the bit distribution for the spectral components, whereupon time output data are obtained by decoding within the decoding part of the codec stage.

In the last few years, considerable advances have been made in the coding of sound signals with the least possible losses in sound quality. Such modern coding methods utilize the threshold of hearing of the human ear and try to adapt to the corresponding perceptual threshold the quantization noise generated by coding in such a way that, despite considerable data reduction, there is no audible deterioration. The coding and decoding devices which operate on this principle are also known as "perceptual codecs".

Such methods are suitable for a number of applications. They can be used to advantage practically everywhere where high-quality sound signals are to be stored or transmitted and the available capacity, e.g. the storage volume or the channel width, is to be used as effectively as possible.

Examples of such uses are the transmission of music over the ISDN telephone network, the storage of audio announcements or so-called "jingles" in flash ROM storage cards and the storage of music within music recorders using a so-called minidisk or the DCC method.

Examples of coding methods which use the above principle are those employed by the company Dolby Inc. under the names AC-2 and AC-3, the ATRAC method of the company Sony Corp. and the sound methods based on the standards ISO-MPEG (IS11172-3), layer 1-2-3.

All these processes are block-oriented, i.e. they analyse in each case a certain number of time input audio data, or audio sampling values, in other words a "data block", and determine for each block the spectral components present in the short-time spectrum associated with these data blocks. Afterwards the spectral components are quantized and coded, the coder employing a psycho-acoustic model to analyse the short-time spectrum so as to determine the bit distribution for the individual spectral components.

To summarize, one can also call this method "perceptual noise shaping": the noise induced by the quantization process is adapted to the perceptual threshold, the coder seeking to maintain a safe distance ("noise-to-mask ratio", NMR) from the estimated perceptual threshold.

In known methods for the coding and decoding of audio data, the sound quality of the audio signal on the output side deteriorates as the number of codec stages increases.

EP-A-0420745 contains a description of a coding device for generating digital audio signals in which the bandwidth for higher frequency ranges of the digital signals increases progressively and the coded signals for the various frequency ranges are formed in such a way that the number of sampled values within a block increases for higher frequency ranges. Quantization of the signals is achieved by assigning a certain number of bits to each of the bands.

The technical publication Alta Frequenza, Vol. XLVI, No. 8, August 1977, Milan, pp. 362–364 discusses the signal-noise ratio occurring in cascaded adaptive differential pulse code modulation codecs. The deterioration in the signal due to the multiple coding and decoding processes appears as a monotonically decreasing series.

SUMMARY OF THE INVENTION

The present invention furnishes a method for the cascaded coding and decoding of audio data in which the quality of the audio signal on the output side is impaired only slightly when the number of coding-decoding (codec) stages increases. During coding of the audio signal, intervals of audio data are captured and their frequency spectra determined. During decoding, the spectras of successive blocks of data are used to reconstruct the original audio data.

Noise can enter the audio signal during decoding operations if the coding operation of each stage does not segregate the audio signal into blocks of data with the identical initiation and termination points. The method includes an identification code with the code for a data block that signifies the beginning of sampling. Coding at subsequent codec stages use this identification code to begin sampling at the same point in the audio signal and, hence, reduces the noise that otherwise would be present in the decoded signal due to asynchronous sampling.

DETAILED DESCRIPTION OF THE PREFERRED EMBODIMENT

Figure 1:
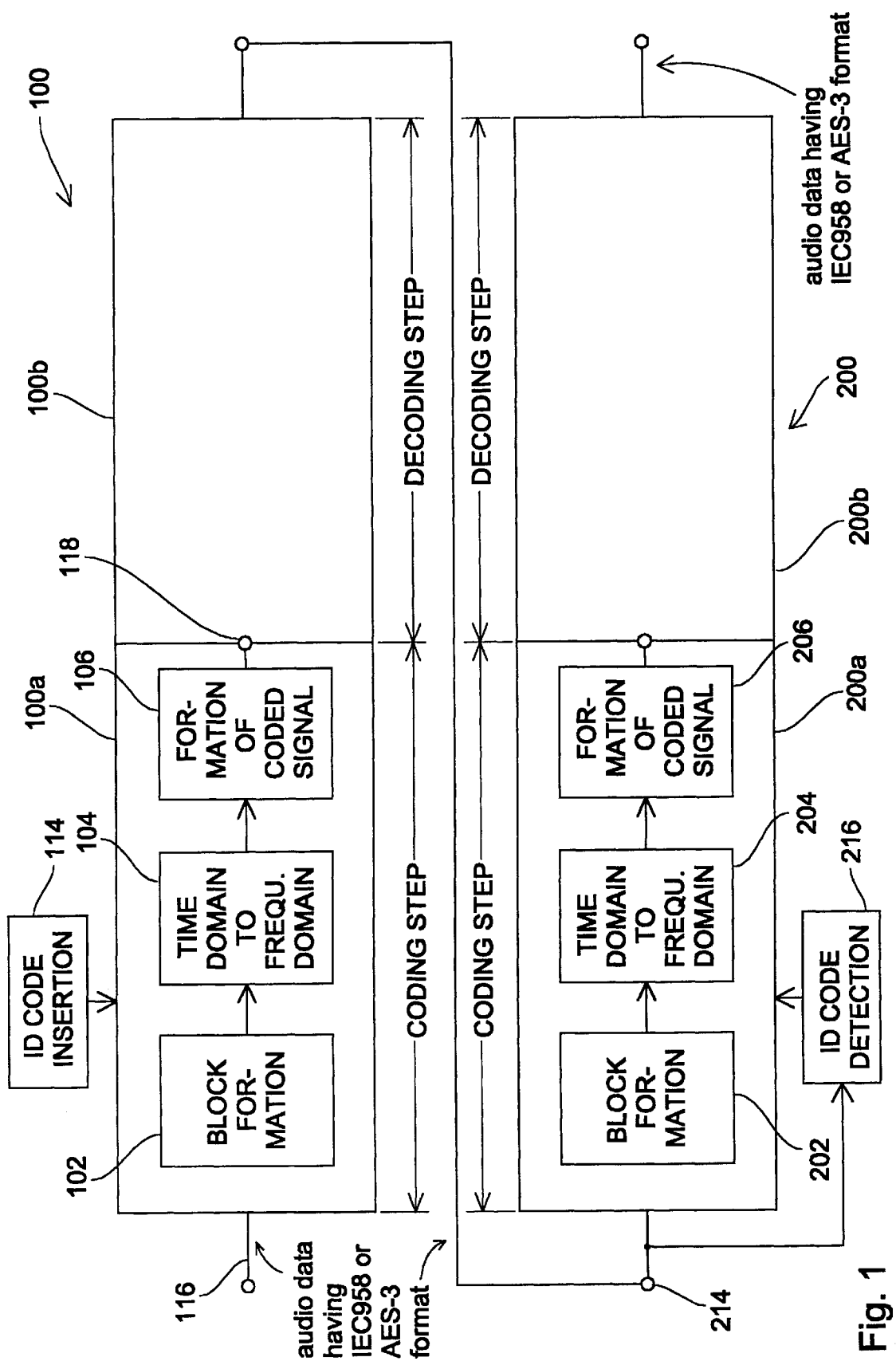
FIG. 1 shows a schematic block diagram depicting a cascade of two codec stages.
Figure 2A:
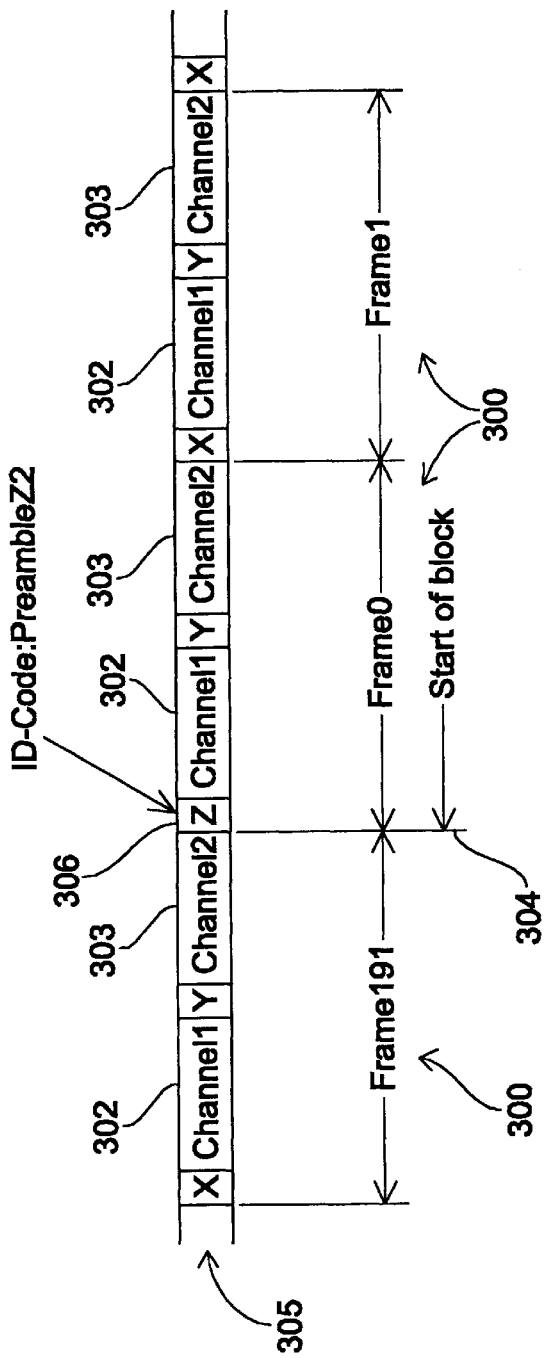
FIG. 2(a) shows the position of the identification code, when blocks of audio data have a size which is an integral multiple of the AES-3 block size.
Figure 2B:
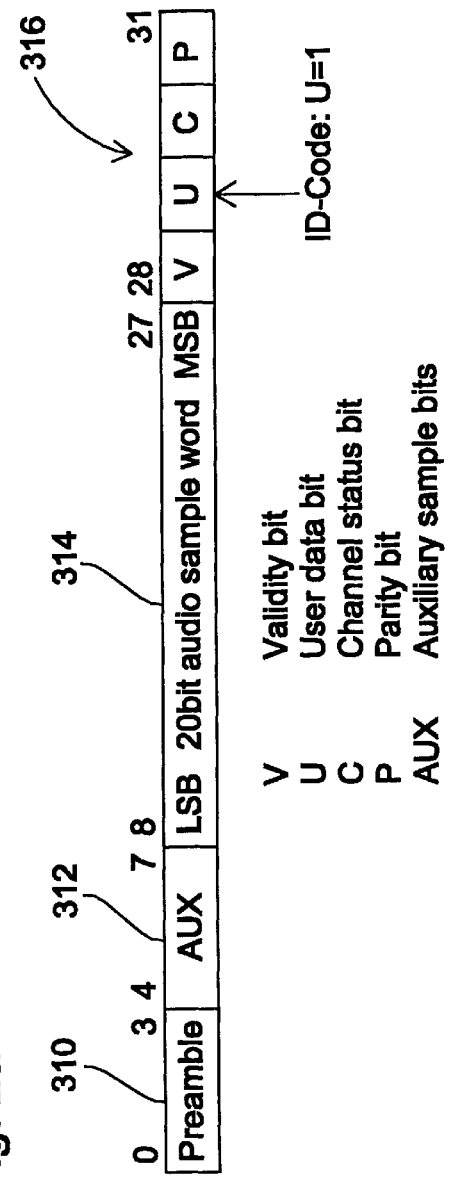
FIG. 2(b) shows the position of the identification code, when blocks of audio data have a size which is not an integral multiple of the AES-3 block size.

The present invention is based on investigations on cascaded audio codecs, also called "tandem codecs", which have shown that in the case of known methods the sound quality deteriorates after each successive codec step even when there is exclusive use of digital PCM interfaces within the codec chain.

The present invention is based on the perception that the cause of this quality deterioration in the case of the known methods lies in the asynchronous block formation in each individual codec stage with reference to the position of the block in the preceding codec stages. In other words, in known methods different sets of input data are combined to form a "data block" within each codec stage, depending on the switch-on time. As a result, in such methods each codec processes a different short-time spectrum, which necessarily results in different bit distributions.

In an expressive extreme case this may mean that in one codec stage a pre-echo is correctly covered by a subsequent attack, whereas the next codec stage positions the block boundary exactly between the pre-echo and the attack and thus analyses the two partial signals separately, which may result in a completely different bit distribution.

The present invention therefore makes the following provision: at one coding step at least within at least one codec stage of the plurality of cascaded codec stages, the coded signal is provided with an identification code marking the start of a data block; furthermore, in at least one of the subsequent codec stages in the cascade the division of the data blocks to be coded is based on this identification code.

The present invention furnishes a method for the cascaded coding and decoding of audio data in which in each of a plurality of codec stages, the following steps are carried out:
for a data block with a certain number of time input data the spectral components of the short-time spectra associated with this data block are formed;
a coded signal is formed on the basis of the spectral components of the data block and employing a psychoacoustic model, and
the coded signal is decoded to produce time output data, whereby in the coding step in one of the codec stages the coded signal has an identification signal added to it which marks the start of a data block, and in the coding step in at least one of the subsequent codec stages in the cascade, the division of the input data in the data blocks to be coded is performed on the basis of the identification code.

In the simplest case this identification code marks the start of a data block. Insofar as the codec stages of the cascade are homogeneous, i.e. form blocks of the same size, the provision of the separation in the coded sound signal makes synchronous block formation possible at least within the mutually homogeneous codec stages of the chain. As a consequence, the subsequent codec stages having the same block size as in the codec stage which added the identification code perform a similar evaluation of the short-time spectra. The synchronous block formation, at least within the mutually homogeneous stages of the codec chain, achieved in this way produces a considerable improvement in the sound quality, especially for codec chains having more than three cascade stages, whereby an increase in the NMR values of about 2 dB compared with unsynchronized codec chains is easily possible.

The method according to the present invention is particularly important in its application to the digital audio signal, especially in the case of the widely accepted standard AES-3. This standard is currently used in professional studio circles and also, in a variant of the standard IEC 958, within customer devices such as CD players, DAT recorders, DCC recorders, MD recorders and so-called "digital amplifiers".

The standard AES-3 has a block-oriented structure. Each block contains 192 sampling values from two audio channels, the start of a block in the data stream being characterized by a special preamble "Z". There are 32 bits available for each sampling value: 4 bits for the preamble, 4 bits for auxiliary data ("AUX" 312), 20 bits for the sampling value 314 itself and 4 bits for additional subcode data ("V, U, C, P").

Various mechanisms of the AES-3 standard are available for indicating the first sampling value of a coded "data block" in accordance with the method according to the present invention. A distinction must be made here between:
a) data blocks whose size is not an integral multiple of the AES-3 block size of 192 sampling values.
b) data blocks whose size is an integral multiple of the AES-3 block size of 192 sampling values.

to a) In this case it is not possible to exploit the block structure of the AES format to advantage. The first sampling value of a coded data block may be located anywhere within an AES-3 block.

In accordance with the present invention the identification takes place at the appropriate sampling value in this case. For this purpose the "user-data" bits can be used, namely, in the so-called time slot 29, the bit "U", which e.g. can be set to "1" for the start of the block and to "0" within the block. In the so-called "channel status" (time slot 30 "C") this meaning of the U data channel could be noted in byte 1, bits 4–7 ("encoded user bits management").

The advantage of this solution lies in an extension of the AES-3 standard which is fully compatible with emerging hardware solutions. Similar solutions can be envisaged for the standard IEC 958.

In accordance with the present invention additional identification codes, over and above the fundamental block markings, can be introduced which support the work of the codec, e.g. information about the currently used size of the coded data block, the nature of the coding, etc.

to b) In this special case, in accordance with the present invention, the block structure of the AES-3 signal can be used to accommodate the coded data blocks directly in the AES-3 raster. In this case the identification can also be effected by the special preamble "Z2", which replaces the present block preamble at the appropriate place.

FIG. 1 shows a block diagram of two cascaded codec stages. A first codec stage 100 comprises a coder 100a and a decoder 100b. The second code stage comprises a coder 200a and a decoder 200b. According to an embodiment of the present invention, the two codec stages forming a cascade of codec stages substantially have the same structure as it is shown in FIG. 1. Each coder 100a and 200a comprises means for block formation 102, 202; means for performing a blockwise transform from the time domain 104, 204; and means for forming a coded signal 106 and 206. Each codec stage 100 and 200 further comprises a decoder 100b and 200b, as has already been mentioned. Each decoder comprises respective means for annulling the processing performed by the coders.

In accordance with the present invention, one codec stage further includes means 114 for inserting an identification code marking the start of a data block output by the block formation means 102. This marking of the start of a data block can be performed after having formed the block by the block formation means 102 or after having transformed the block form the time domain into the frequency domain or after having formed the coded signal. Thus in a coding step in the codec stage 100, the time input data input via an input terminal 116 are processed such that the coded signal output by the means 106 for formation of the coded signal 118 comprises an identification code marking the start of the respective data block. At the decoding step carried out by the first decoder 100b, the coded signal having the identification code marking the start of a data block is again decoded and input into an input terminal 214 of the subsequent codec stage 200.

The coding step of the codec stage 200 is carried out by the coder 200a, preferably, by the same steps as performed in the first coder. In addition, the signal input into the coder 200a is input into means 216 for detecting the identification code marking the start of a data block. Based on the identification codes marking the starting points of respective data blocks which have been used in the first coder 100a, the means for block formation 202 of the second coder 200a performs the division of the input data into the data blocks to be coded. This assures that the division of the data input at the input terminal 214 of the second codec into the data blocks to be coded, i.e. the data blocks output by the blocks formation means 202, is performed on the basis of the identification code. Thus, the second coder 200a performs the same block formation as the first coder 100a. By this, audible distortions caused by tandem coding by means of cascaded codec stages can be minimized or even eliminated.

What is claimed is:

1. A method for cascaded coding and decoding of audio data comprising the steps of:

coding audio data, in each of a plurality of cascaded coding-decoding (codec) stages, so that for a block of audio data with a certain number of time input data, the spectral components of the short-time spectrum associated with this block are formed and so that a coded signal is formed on the basis of the spectral components of the block and a psycho-acoustic model; and decoding the coded block of audio data, in each of a plurality of cascaded codec stages, so that the coded signal is decoded to produce time output data;

wherein at the coding step in one of the codec stages the time input data are processed such that the coded block of audio data includes an identification code marking the start of the coded block of audio data, the identification code not being removed by the decoding step of this codec stage, and at the coding step in at least one of the subsequent codec stages in the cascade, the division of the input data into blocks of audio data to be coded is performed on the basis of the identification code.

2. The method of claim 1, wherein the identification code indicates its coded block's first sampling value.

3. The method of claim 2, wherein at least in mutually homogeneous codec stages within a codec chain, synchronous block formation with the same block size and with the same location of the division of the data in blocks is performed on the basis of the identification code.

4. The method of claim 1, wherein audio data is coded according to the standard AES-3.

5. The method of claim 1, wherein audio data is coded according to the standard IEC958.

6. The method of claim 4, wherein for blocks of audio data whose size is an integral multiple of the AES-3 block size, the blocks are arranged within the AES-3 raster and the identification code consists of a special preamble ("Z2").

7. The method of claim 4 wherein the identification code indicates its coded block's first sampling value, and, further, wherein for blocks of audio data whose size is not an integral multiple of the AES-3 block size, the identification code indicating the first sampling value of the coded block is located in a "user-data" bit of the block concerned.

* * * * *